United States Patent
Ament et al.

[19]

[11] Patent Number: 6,125,908
[45] Date of Patent: Oct. 3, 2000

[54] ROLLING COVER FOR USE IN COVERING ITEMS STORED IN A VEHICLE STORAGE AREA

[75] Inventors: Eduard Ament, Aichwald; Holger Seel, Aidlingen; Marina Ehrenberger, Esslingen, all of Germany

[73] Assignee: BOS GmbH & Co. KG, Aichwald, Germany

[21] Appl. No.: 09/133,908

[22] Filed: Aug. 13, 1998

[30] Foreign Application Priority Data

Aug. 20, 1997 [DE] Germany .................. 197 36 170

[51] Int. Cl.⁷ ............................................. A47G 5/02
[52] U.S. Cl. .................. 160/323.1; 160/370.22; 296/37.16
[58] Field of Search ................ 160/323.1, 238, 160/250, 263, 24, 903, 370.22; 296/37.16, 98

[56] References Cited

U.S. PATENT DOCUMENTS

| | | | |
|---|---|---|---|
| 4,222,601 | 9/1980 | White et al. ................... | 296/37.16 |
| 4,277,097 | 7/1981 | Lalanne ............................ | 296/37.16 |
| 4,668,001 | 5/1987 | Okumura et al. .................. | 296/37.16 |
| 4,671,557 | 6/1987 | Lemp ................................ | 296/37.16 |
| 4,781,234 | 11/1988 | Okumura et al. ................. | 160/323.1 X |
| 5,618,077 | 4/1997 | Ament et al. ...................... | 296/37.16 |
| 5,676,415 | 10/1997 | Ament et al. ..................... | 296/37.16 |
| 5,813,449 | 9/1998 | Patmore et al. ................... | 160/323.1 X |
| 5,881,793 | 3/1999 | Righter et al. .................... | 160/323.1 |

FOREIGN PATENT DOCUMENTS 44 41 260  5/1997  Germany .

*Primary Examiner*—David M. Purol
*Attorney, Agent, or Firm*—Leydig, Voit & Mayer, Ltd.

[57] ABSTRACT

A rolling cover has two end caps movable toward one another. The movability of the end caps toward one another and/or away from one another serves to make it possible to easily lock the rolling cover in corresponding vehicle-side receiving pockets or to remove the rolling cover therefrom. An actuating mechanism is present to which the two end caps are additionally joined. This actuating member permits the end caps to be moved in an ergonomically favorable manner by a single hand.

21 Claims, 5 Drawing Sheets

ROLLING COVER FOR USE IN COVERING ITEMS STORED IN A VEHICLE STORAGE AREA

FIELD OF THE INVENTION

The present invention relates to vehicular accessories and, in particular, to a rolling cover for use in covering items stored in a vehicle storage area.

BACKGROUND OF THE INVENTION

In the art, rolling covers for use in covering the loading or baggage space of passenger cars are known. Generally, known rolling covers have end caps joined axially slidably with the winding shaft. The end caps are cup-shaped and grip with their collar the roll of a shade formed on the winding shaft. The axial movability of the winding shaft with respect to the end caps is needed for two reasons. First, it allows the shading, when in the drawn-out state, to center itself automatically between the side walls of the loading space. Secondly, the movability is utilized in order to anchor the winding shaft to the vehicle sides. However, it is seen that the relatively strong springs that press apart the end caps render handling appreciably difficult. In particular, the compressing of the end caps must be done against the action of the springs with nearly extended arms in a relatively unfavorable body position.

OBJECTS AND SUMMARY OF THE INVENTION

It is an object of the invention to provide a rolling cover for use in an automobile that is more simply handleable with respect to its removal from and attachment to the vehicle.

More specifically, it is an object of the invention to provide such a rolling cover that may be installed and removed from a vehicle using the motion of a single hand.

Other objects and advantages of the invention will become apparent upon reading the following detailed description and upon reference to the drawings, in which:

Figure 1:
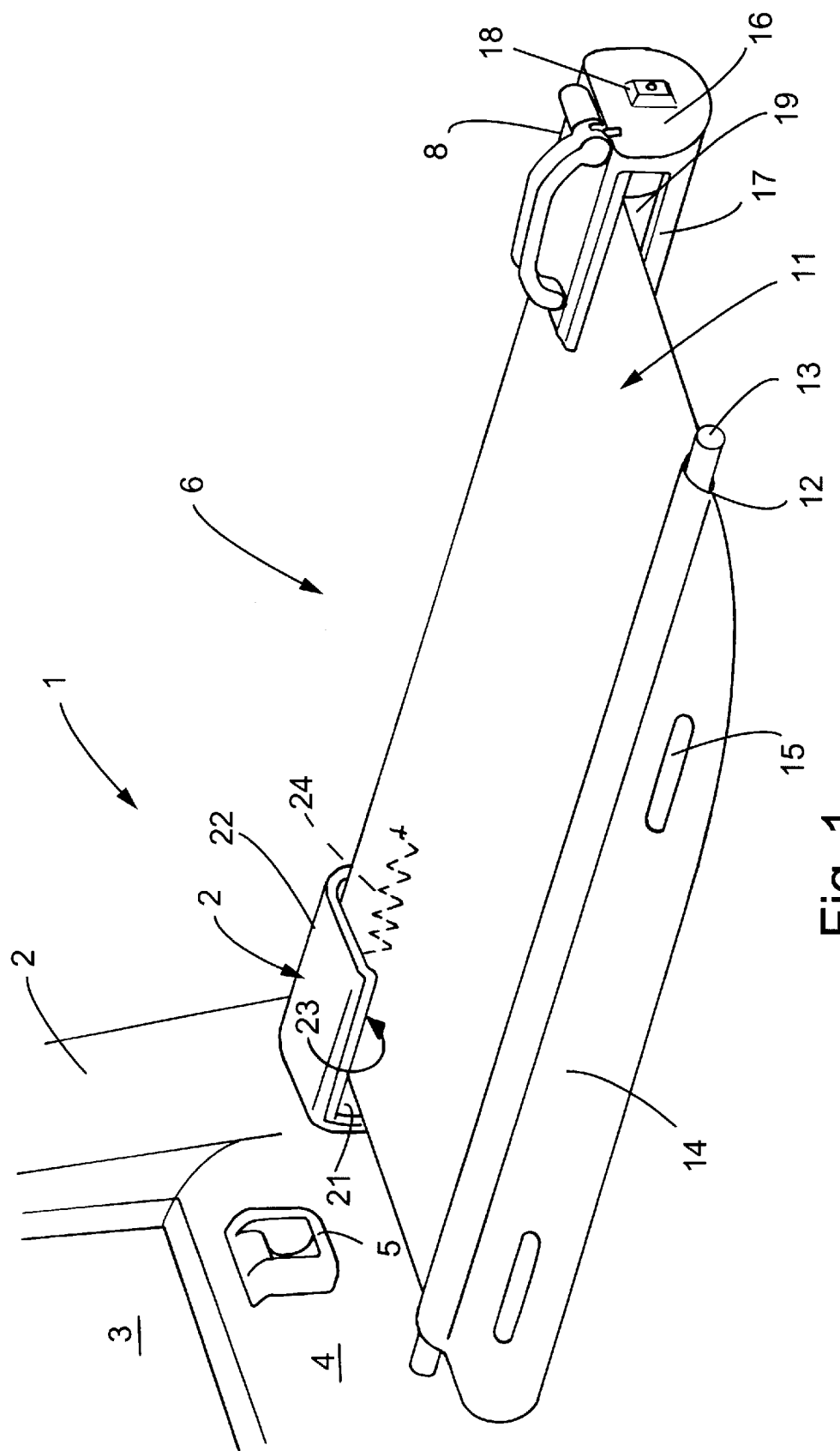
FIG. 1 is a perspective view of a rolling cover in accordance with the invention in a partially drawn-out position in the cargo space of a passenger car.

While the invention is susceptible of various modifications and alternative constructions, a certain illustrated embodiment thereof has been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE DRAWINGS

Referring now to FIG. 1, there is shown in partial perspective a cargo space 1 of a passenger car. As illustrated, the car includes a columnar wall 2, an adjoining rear side window 3, and a rear side wall 4 situated under the rear side window 3. As will be appreciated, the side of the cargo space 1 not seen in the figure is to be thought of as a mirror image to the side illustrated. In each of the two side walls 4 there is present a receiving pocket 5 for use in supporting a rolling cover 6 constructed in accordance with the invention.

Figure 4:
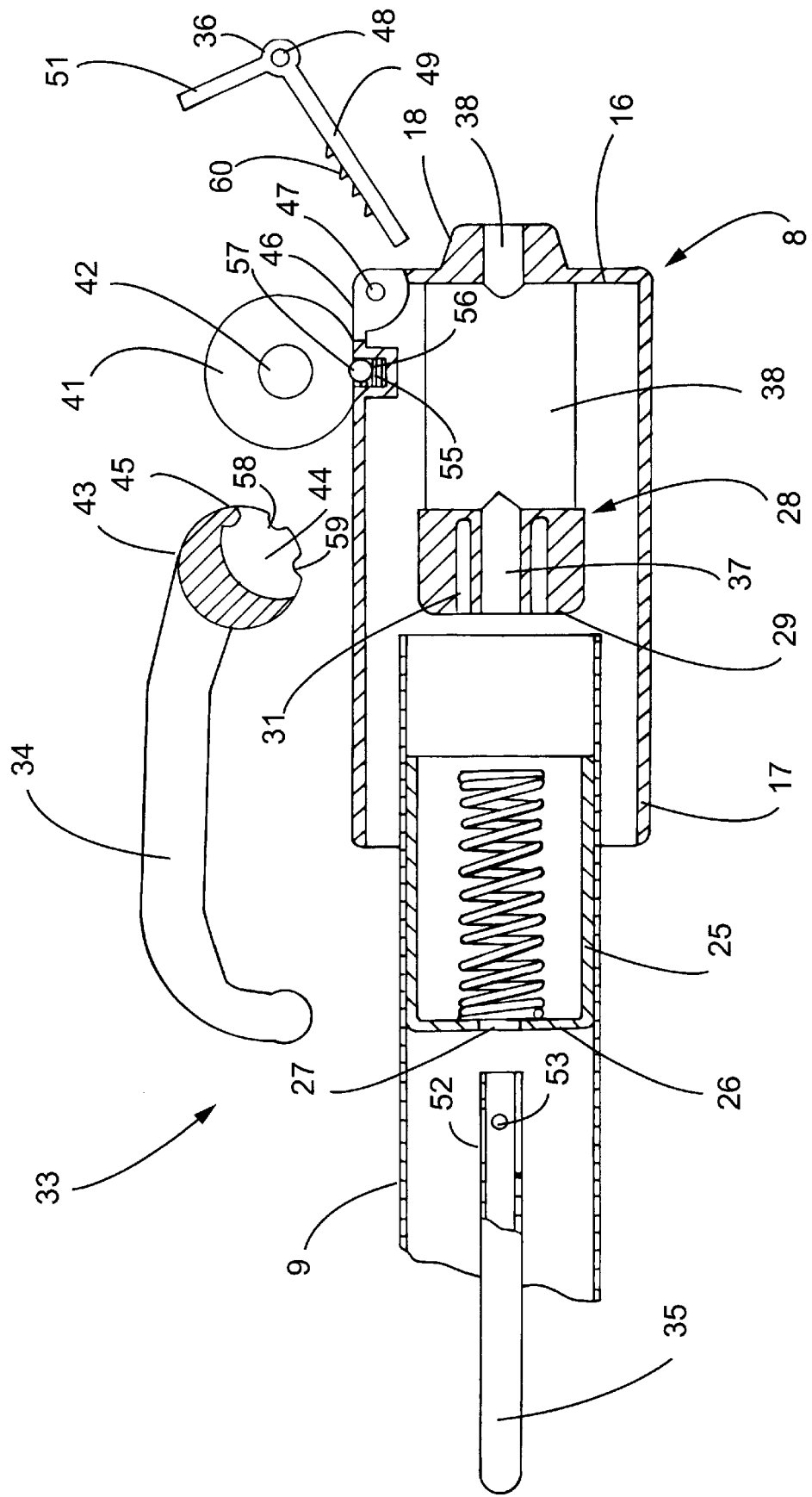
FIG. 4 is an exploded view of the end of the rolling cover shown in FIG. 2.

More specifically, the rolling cover 6 has two cup-shaped end caps 7 and 8 spaced from one another. As best seen in FIG. 4, between the spaced end caps 7 and 8 is turnably borne a winding shaft 9. Returning to FIG. 1, a shading 11 is fastened at one edge to the winding shaft 9. The shading, when drawn, functions to cover the cargo area and hide from view an items stored there below. At the end opposite its attachment to the winding shaft 9, the shading 11 is formed into a tubular loop 12 that generally runs parallel to the winding shaft 9. Through this loop 12 there runs a pull rod 13. The pull rod 13 projects on both ends beyond the side edges of the shading 11. The ends of the pull rod 13 that extend beyond the edges of the shading 11 are adapted to be suspended in complementary pockets attached to the side walls 4 of the vehicle located at the end of the cargo space 1 opposite the receiving pockets 5. A flap 14 with grip holes 15 extends from the shade 11 in front of the loop 12 and is available for covering an area between the anchored pull rod 13 and the end wall of the cargo space 1.

The cup-shaped end cap 8 is preferably a one-piece plastic molded part consisting of an essentially flat bottom 16 to the outer edge of which there is molded a collar 17. From the middle of the cup-shaped bottom 16 there arises an anchoring lug 18, polygonal in cross section, which is provided for insertion into the corresponding pocket of the receiving pocket 5. In consequence of its polygonal cross section shape, the lug or pivot 18 is unturnable in the receiving pocket 5. The collar 17 is provided with a slot 19 that extends generally from a starting location in the vicinity of the bottom 18 completely through to the opposite end of the collar 17. Through the slot 19, as the figure makes evident, the shading 11 can be drawn out. The portion of the collar 17 that will face towards the vehicle top when in use is slightly flattened.

The cup-shaped end cap 7 is mirror-symmetrical to the cup-shaped end cap 8. Accordingly, the end cap 7 includes an essentially flat bottom 21 to which there is molded in one piece a collar 22. The collar 22 likewise contains a run-out slot 23. The two cup-shaped end caps 7 and 8 open toward one another and their run-out slots 19 and 23 are aligned with one another. The bottom 21 carries on its outside an anchoring lug complementary to the anchoring lug 18 for similar acceptance within a corresponding pocket in its associated receiving pocket 5.

To tension the winding shaft 9 in the direction of the winding-up of the shade 11 onto the winding shaft 9, the interior of the winding shaft 9 includes a spiral spring 24, schematically shown in FIG. 1. As will be appreciated by those of skill in the art, the spiral spring 24 rests between the end cap 7 and the winding shaft 9 and serves as a drive arrangement for the winding shaft 9.

Turning now to FIGS. 2 to 5 which depict a first embodiment of the end cap 8 and, in particular, FIG. 4, it is seen that the winding shaft 9 is a cylindrical metal tube into which there is installed a cap-shaped supporting part 25. The supporting part 25 is fixed untwistably and axially unshiftably in the winding shaft 9, for example by point welding. In the bottom 26 of the cup-shaped supporting part 25 there is contained an opening 27 the purpose of which will be explained hereinafter.

Figure 2:
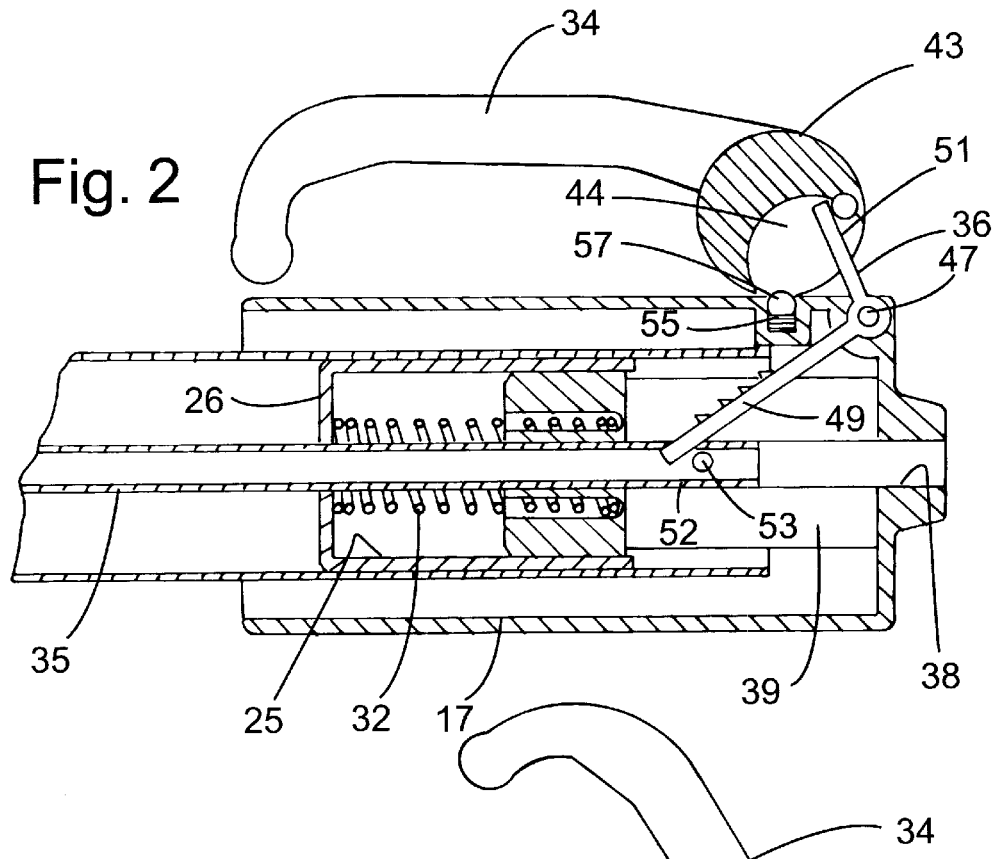
FIG. 2 is a cross-sectional side view of an end of the rolling cover shown in FIG. 1 with its actuating lever in a first operating position.
Figure 3:
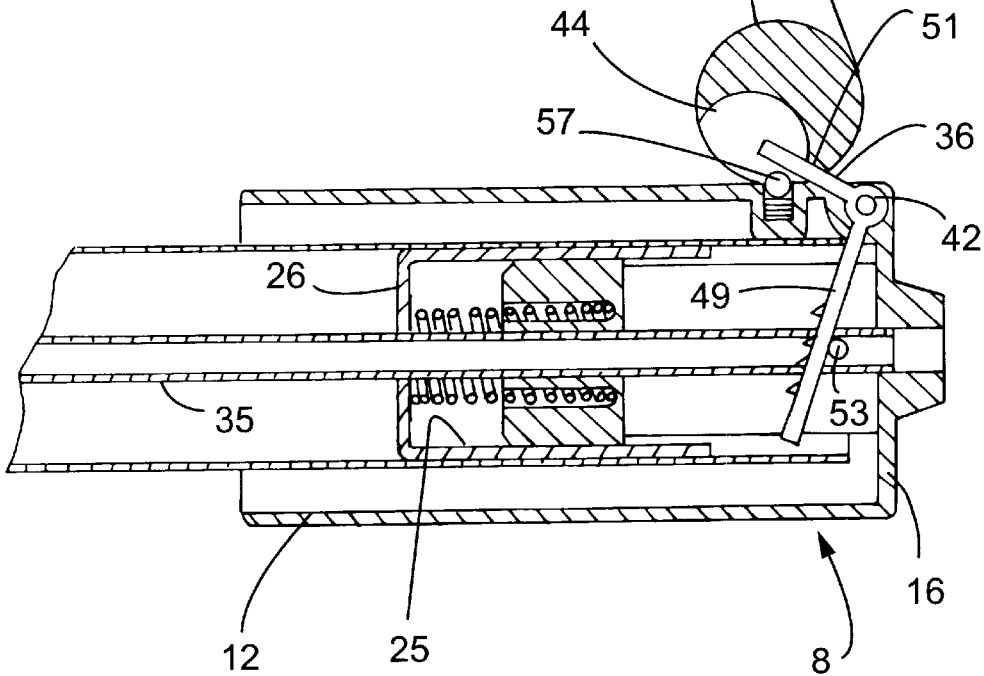
FIG. 3 is a cross-sectional side view of the end of the rolling cover shown in FIG. 2 with its actuating lever in a second operating position.
Figure 5:
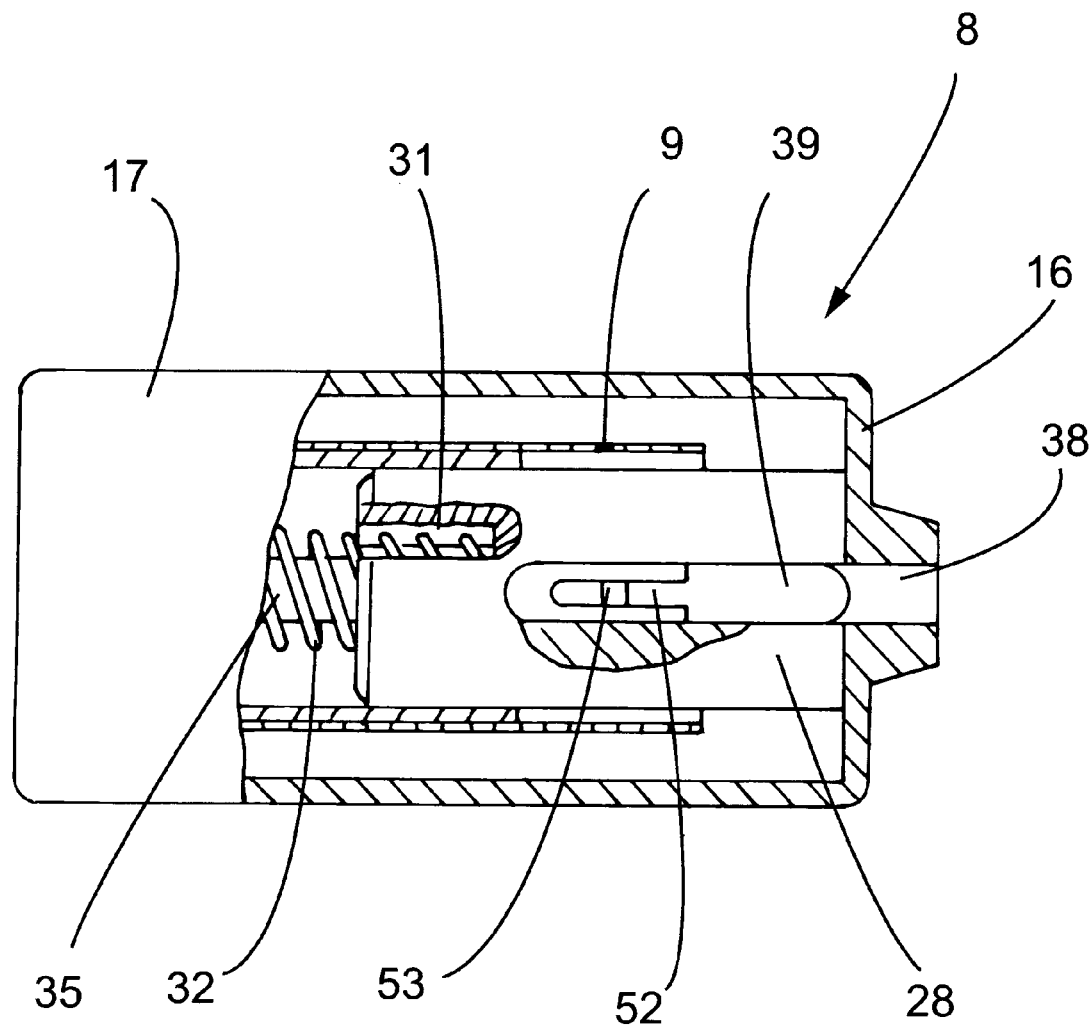
FIG. 5 is a partial cross-sectional bottom view of the end of the rolling cover shown in FIG. 2.

For the bearing of the winding shaft 9 the end cap 8 contains a bearing lug 28 which is molded in one piece to the flat inside of the bottom 16. On its face side 29, lying away from the bottom 16, a cylindrical annular groove or an annular gap 31 leads over a certain distance into the bearing lug 28. The annular gap 31 is constructed concentrically to the axis of the bearing lug 28. Its dimensions are adapted to the dimensions of a spiral pressure spring 32, one end of which is plugged into the annular gap 31 as illustrated in FIGS. 2, 3 and 5. The other end of the spiral pressure spring 32 is supported on the bottom 26 of the supporting part 25. When assembled, the bearing lug 28 projects more or less deeply into the winding shaft 9.

Up to this point there is no constructive difference between the end cap 7 and the end cap 8, for which reason the description thus far given holds also for the end cap 7 and the corresponding zone of the winding shaft 9. In consequence of this formation, the winding shaft 9, with the aid of two spiral pressure springs 32, is borne floating between the two end caps 7 and 8 and on the bearing lug 28, in such manner that it is largely automatically centered between the two end caps 7 and 8. The strength of the pressure springs 32 is chosen so that the end caps 7 and 8 supported on the winding shaft 9 are pressed with corresponding force against the receiving pockets 5 in order to ensure a secure anchoring of the rolling cover 6.

In order to move the end caps 7 and 8 toward one another against the action of the spiral pressure springs 32 so that the rolling cover 6 can be removed, an actuating mechanism 33 is present. This actuating mechanism 33 comprises essentially an operating lever 34, a pull-fast connecting member 35 as a coupling lever 36.

The pull-fast connecting member 35 is a tubular rod that runs coaxially through the winding shaft 9 and is anchored in the bearing lug of the end cap 7 in a suitable manner to render the rod 35 untwistable and axially unshiftable. It passes into the end cap 7 through the opening 27 in the supporting part 25. Consequently the rod 35 runs also through the spiral pressure spring 32.

In the end cap 8 the rod 35 is guided longitudinally slidably. For this purpose the bearing lug 28 contains a coaxial passage bore 37. The passage bore 37 aligns with another passage bore 38 formed through the bottom 16 and the anchoring lug 18. In a section of the bearing that begins adjacent to the inside of the bottom 16 and ends shortly before the inside-lying end of the annular gap 31, the bearing lug 28 contains a continuous oblong hole 39. The hole 39 extends to a diameter of the bearing lug 28 and has a width that corresponds to the diameter of the bores 37 and 38. The clear diameter of the bores 37 and 38 is equal to the outside diameter of the rod 35.

For the bearing of the operating lever 34, on the flattened upper side of the collar 17, in the vicinity of the bottom 16 there is molded a bearing piece 41 which contains a bearing bore 42 for the reception of a shaft. The bearing bore 42 runs at a right angle to the longitudinal axis of the winding shaft 9 and horizontally when the rolling cover 6 is positioned within the automobile.

One end 43 of the operating lever is substantially disk-like in form and has an outside diameter corresponding with the outside diameter of the bearing piece 41. In the disk-shaped end 43 there is contained a sickle-shaped groove 44, open to the circumferential side, which terminates into a rounded actuating bulge 45.

In the mounted state there is aligned with the sickle-shaped groove 44 a slot 46 that is located generally at the point where the bottom 16 transitions to the collar 17. Through this slot 46 the coupling lever 36 passes and, furthermore, it is borne there. For this purpose, there runs transversely to the slot 46 a bore 47 which serves for the reception of an axial pin which leads through a bore 48 aligned with it in the coupling lever 36.

The coupling lever 36 has two arms 49 and 51 that run about at a right angle to one another. In the mounted state, the arm 49 runs into the interior of the cap 8 and into the oblong hole 39. The arm 51, in contrast, lies in the sickle-shaped groove 44 where it is capable of contacting the bulge 35.

In order to connect the coupling lever 36 operatively with the rod 35, the latter contains a slot 52. The rod 35 also includes a cross pin 53 positioned adjacent to the slot 52. The cross pin 53 acts together with arm 49 to move the rod 35 in a manner to be described hereinafter.

In order to hold the operating lever securely in its rest and/or in its functioning position, an arresting arrangement is provided consisting of a blind bore 55 in the collar 17 that opens to the outside and in which there are contained a pressure spring 56 as well as a stop ball 57. The stop ball 57 cooperates with two stop recesses 58 and 59 in the disk-shaped end 43 to maintain the lever in the desired position.

The rod 35 runs through the opening 27, is coaxially surrounded by the spiral pressure spring 32 and is guided axially with little radial play in the passage bore 37. The slot 52 defines a slot plane that lies parallel to the plane of the oblong hole 39 so that the arm 49, proceeding from the slot 46, as shown in FIGS. 2 and 3, can extend through the oblong hole 39 on into the slot 52. Simultaneously the arm 51 of the coupling lever 36 stands comparatively far from the outside of the collar 17, as shown in FIG. 2, loosely on the actuating bulge 45.

To install the thus-far described rolling cover 6 into the vehicle, the operating lever 34 is moved out of the position shown in FIG. 2, in which the latter lies essentially parallel to the axis of the winding shaft 9, into the upright position, as shown in FIGS. 3. In consequence of this swinging movement, which occurs clockwise in respect to FIG. 3, the arm 51 of the coupling lever 36 is pressed down onto the outside of the collar 17. It thereby executes in respect to its shaft pin 47 a rotation in clockwise direction. This clockwise rotation leads the arm 49, proceeding from the position according to FIG. 2, closer to the inside of the bottom 16. Since the arm 49 extends between the end of the slot 52 and the connecting pin 53, the end concerned of the connecting rod 35 is necessarily carried along likewise in the direction of the bottom 16. When the lever, as shown in FIG. 3, is brought completely into an upright position and its stop recess 58 is engaged with the ball 57, the free end of the rod 35 extends into the bore 38.

Since the rod 35 is jointed pull-fast with the end cap 7 and has a fixed length, the bringing up of the lever necessarily moves the two end caps 7 and 8 toward one another resulting in the spacing between the two anchoring pins 18 becoming correspondingly smaller. Since the lever 34 together with the coupling lever arranged in between delivers a considerable translation ratio, the actuating force required for the swinging of the lever 34 is clearly less than the force with which the two spiral pressure springs spread the end caps 7 and 8 away from the winding shaft 9. Moveover, the actuation is ergonomically substantially more favorable, because the moving toward one another of the two end caps 7 and 8 does not require that these caps be grasped with both hands, but the handling occurs only at one end of the rolling cover 6, namely in the zone of the end cap 8. If necessary here, too, both hands can be resorted to in order to bring the operating lever 34 into upright position.

With the operating lever 34 upright, the effective length of the rolling cover 6 is correspondingly short as measured by the direction parallel to the winding shaft 9, and the rolling cover 6 can be installed in the vehicle or taken out of the vehicle, as at least one of the anchoring pins 18 has become completely free from the corresponding receiving pocket 5.

In the installing, first of all the anchoring pin 18 of the end cap 7 is laid into the appropriate receiving pocket. The anchoring pin 18 of the end cap 8 is then aligned on the receiving pocket 5 and the operating lever 34, proceeding from the position according to FIG. 3, is swung back into the position according to FIG. 2. In this process it executes a swinging movement counterclockwise and the operating bulge 45 is hereby led away from the arm 51. Since the other arm 49 stands under the action of both spiral pressure springs 32, it is drawn away from the bottom 16 in the direction toward the position shown in FIG. 2.

Since the operating lever 34 no longer blocks the movement of the coupling lever 36, the latter can adjust itself freely under the action of the spiral pressure springs 32 and the two end caps 7 and 8 can move away from each other until they are hampered in a further movement by the vehicle side receiving pockets 5. The rolling cover 6 is thus firmly installed.

In the rest position of the operating lever 34, the free end of the arm 49 points to the lower edge of the slot 52. If in this position, in consequence of a transverse acceleration of the vehicle, the two end caps 7 and 8 are moved toward one another, the arm 49 will be raised on the inside-lying end of the slot 52 and will collide, therefore, with the lower slot edge, so that the arm 49 acts as a support that blocks the further movement of the rod 35 in the direction of the bottom 16 of the end cap 8. Thus the arm 49 in connection with a correspondingly formed slot 52 acts as a security means, which on transverse accelerations prevents a movement of the two end caps 7 and 8 directed toward one another, unless the lever 34 is simultaneously set upright.

So that also in intermediate positions the blocking of the movement is assured, on the arm 49 there may be formed several saw tooth-like extensions 60 which, in other intermediate positions of the end caps 6 and 8 which are compelled by the spacing of the receiving pockets 5 from one another, come into engagement with the inside-lying end of the slot 52. The steep flank of the extensions 60 come to lie correspondingly on the edge of the slot 52.

Figure 6:
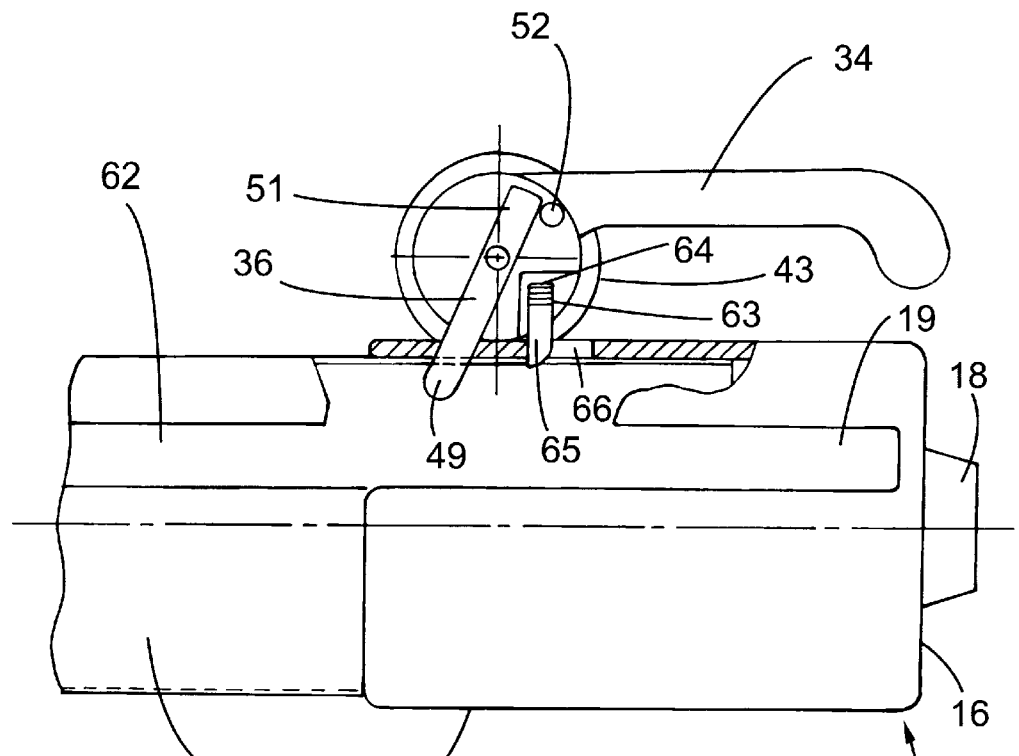
FIG. 6 is a side view of an alternative embodiment of the end of the rolling cover shown in FIG. 1 with its actuating lever in a first operating position.
Figure 7:
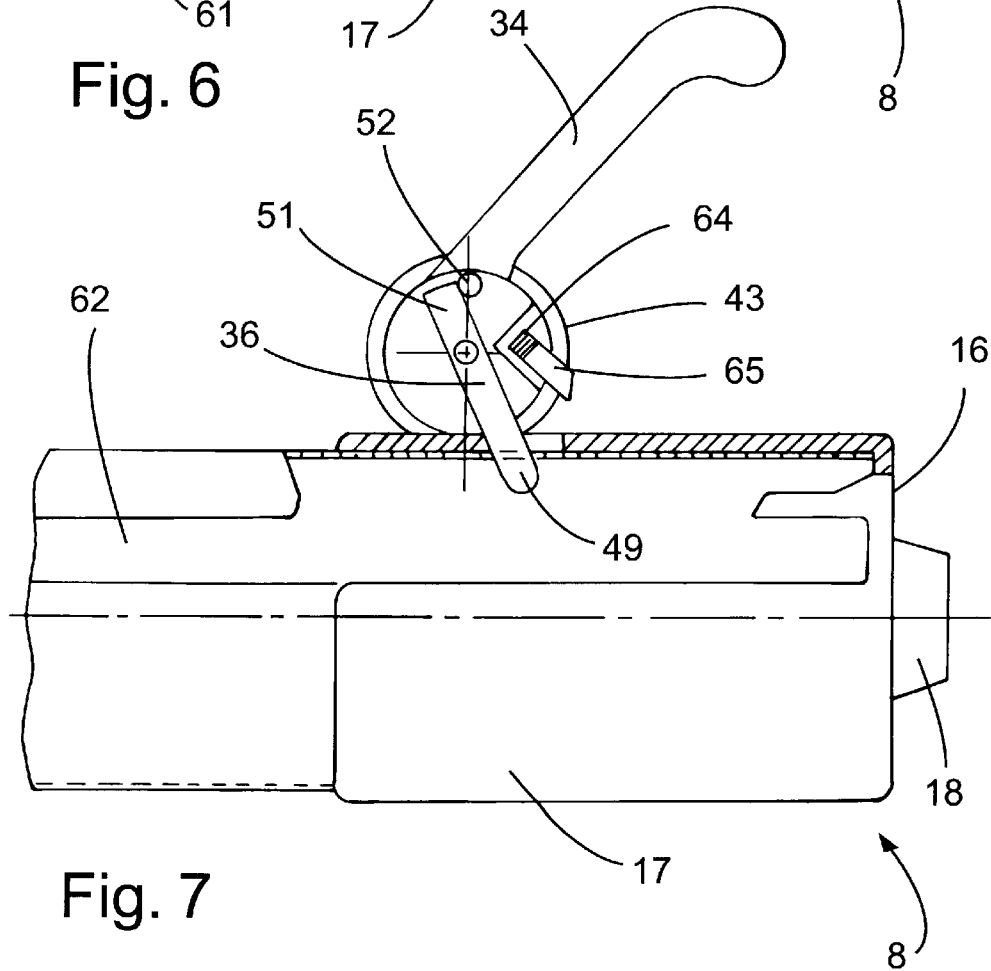
FIG. 7 is a side view of the end of the rolling cover shown in FIG. 6 with its actuating lever in a second operating position.

Instead of the rod 35 as connecting member between the two end caps 7 and 8, for the actuating mechanism 33 there can also be used in an alternative embodiment a housing sleeve 61, as is shown in FIGS. 6 and 7. Since the functioning and the construction are essentially similar, the following description of the alternative embodiment is restricted to an explanation of the arrangement in the region of the end cap 8 while otherwise, for already described structural elements corresponding to one another in function, the same reference numbers are used without any renewed explanation.

In the example of execution according to FIGS. 6 and 7 the rod 35 is absent, instead there being seated untwistably and axially unshiftable in the end cap 7 the housing sleeve 61. The housing sleeve 61 is provided with a run-out slot 62 for the shading 11. This slot 62 is aligned with the corresponding slots 23 and 19. In the end cap 8 the housing sleeve 61 is axially shiftable, but it is unturnably fixed with respect to the end cap 8.

The operating lever 34 is turnably borne on the end of the collar 17 lying away from the bottom 16. Coaxially to the lever 34 the coupling lever 36 is likewise turnably borne, namely, so that its arm 49 extends through a slot running in longitudinal direction in the collar 17 into the interior of the end cap 8. There the arm 49 leads through a small opening in the housing sleeve 61. The other arm 51 cooperates with a follower pin 52 of the operating lever 34. The follower pin 52 is arranged adjacent to the arm 51 to ensure that, as in the example of execution according to FIGS. 1 to 5, the lever 34 can always be swung into the completely depressed position even when the two end caps 7 and 8 are secured within the receiving pockets 5 at a distance shorter than the fully extended position illustrated in FIG. 6.

The handling of the example of execution according to FIGS. 6 and 7 takes place in such manner that for the setting-in or taking-out, proceeding from the position according to FIG. 6, the operating lever 34 is swung upward counterclockwise. Thereby the end of arm 49 standing in engagement with the housing sleeve 61 is moved toward the bottom 16. This movement results in an opposite movement of the end cap 8 on the housing sleeve 16 in the direction toward the oppositely lying end cap 7, whereby the distance between the two end caps 7 and 8 is sufficiently decreased so that the rolling cover 6 can either be taken out or installed. The swung-up position of the operating lever 34 is shown in FIG. 7.

Also in the example of execution according to FIGS. 6 and 7, there is possible a blocking of the relative movement between the end cap 8 and the housing sleeve 61. For this the operating lever 34 has in its disk-shaped end 43 a bore 63 with a latch 65 pre-tensioned by means of a spring 64. The latch 65 leads through an elongated opening 66 in the collar 17 and extends into a corresponding opening in the housing sleeve 61. Since the latch 65, as shown, is beveled, it does not hamper the swinging-up of the lever 34. If, however, with the operating lever 34 laid flat, it should be attempted to move the end cap 8 on the housing sleeve 61 in the direction toward the oppositely lying end cap 7, the edge of the opening 66 will come to lie on the latch 65, so that after a distance corresponding to the length of the opening 66 a further movement in the direction of the end cap 7 is prevented.

What is claimed is:

1. A rolling cover for covering off a loading space in a passenger motor vehicle, comprising:

two end pieces spaced from one another, each end piece having an outer face which includes a respective anchoring member which is removably insertable into a respective vehicle-side receiving pocket;

a winding shaft extending between the end pieces, the winding shaft being rotatably supported in the end pieces and axially slidable with respect to the end pieces;

a shading fastened to the winding shaft;

a drive arrangement supported on one of the end pieces for use in winding the shading onto the winding shaft;

a pair of spring members each disposed between a respective one of opposing ends of the winding shaft and the corresponding end piece so as to pre-tension the end pieces in a direction away from the winding shaft; and an actuating mechanism joining the two end pieces, the actuating mechanism being operable to move the two end pieces toward one another.

2. The rolling cover according to claim 1, wherein the actuating mechanism further comprises a connecting member that extends between the end pieces.

3. The rolling cover according to claim 2, wherein a first end of the connecting member is fixed to one of the end pieces.

4. The rolling cover according to claim 2, wherein the connecting member has opposing first and second ends and the first end of the connecting member is axially and slidably connected with a respective one of end pieces.

5. The rolling cover according to claim 4, wherein the first end of the connecting member is connected with the respective end piece so as to prevent twisting of the connecting member.

6. The rolling cover according to claim 2, wherein the connecting member comprises a rod which extends through the winding shaft.

7. The rolling cover according to claim 6, wherein the rod has a tubular shape.

8. The rolling cover according to claim 2, wherein the connecting member is a housing sleeve surrounding the winding shaft, and the housing sleeve contains a run-out slot for the shading.

9. The rolling cover according to claim 2, wherein the actuating mechanism includes an arm operatively coupled with the connecting member.

10. The rolling cover according to claim 9, wherein the actuating mechanism includes a two-armed lever having a first end coupled with the connecting member and a second end coupled with the arm.

11. The rolling cover according to claim 10, wherein the two-armed lever is pivotally carried by one of the end pieces.

12. The rolling cover according to claim 1, wherein the actuating mechanism includes an actuating member rotatably carried by one of the end pieces.

13. The rolling cover according to claim 1, wherein the actuating mechanism includes a blocking mechanism which prevents the end pieces from moving a sufficient distance toward one another so as to allow the anchoring members to be released from the receiving pockets without operating the actuating mechanism.

14. The rolling cover according to claim 1, wherein the actuating mechanism comprises a lever which is pivotable about an axis that extends perpendicularly relative to a longitudinal axis of the winding shaft.

15. The rolling cover according to claim 1, wherein the end pieces are substantially mirror-symmetrical.

16. The rolling cover according to claim 1, wherein each end piece has a substantially cylindrical bearing lug on which the winding shaft is supported.

17. The rolling cover according to claim 16, wherein a first end of each of the spring members is supported on a respective one of the bearing lugs.

18. The rolling cover according to claim 17, wherein each of the bearing lugs includes a groove in a side facing away from its corresponding end piece, the groove forming a cylindrical annular gap which receives the first end of the corresponding spring member.

19. The rolling cover according to claim 1, wherein the end pieces are cup-type caps having a bottom and a collar extending from the bottom.

20. The rolling cover according to claim 19 wherein each of the end pieces has a slot in its collar which extends in an axial direction and through which the shading extends.

21. The rolling cover according to claim 1, wherein the anchoring members are lugs with a polygonal cross section.

* * * * *